(12) United States Patent
Inoue et al.

(10) Patent No.: US 7,039,936 B1
(45) Date of Patent: May 2, 2006

(54) RECEIVING SYSTEM FOR DIGITAL BROADCASTING, DATA TRANSMITTING METHOD IN DIGITAL BROADCASTING RECEIVING SYSTEM, AND RECEIVING APPARATUS FOR DIGITAL BROADCASTING

(75) Inventors: Hajime Inoue, Chiba (JP); Tatsuya Wakahara, Tokyo (JP); Naoki Murayama, Tokyo (JP); Masao Mizutani, Kanagawa (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/460,083

(22) Filed: Dec. 14, 1999

(30) Foreign Application Priority Data

Dec. 21, 1998 (JP) ............................... P10-362444

(51) Int. Cl.
*G06F 3/00* (2006.01)
*G06F 13/00* (2006.01)
*H04N 5/445* (2006.01)

(52) U.S. Cl. .................. 725/59; 725/58; 725/141; 725/61; 725/39; 725/37; 715/771; 713/1; 713/100

(58) Field of Classification Search ............... 725/141, 725/133, 68, 70, 71, 58, 59, 61, 39, 37; 715/771, 715/970, 823–824; 710/104–105; 713/1, 713/100, 2
See application file for complete search history.

(56) References Cited

U.S. PATENT DOCUMENTS

| 5,883,621 | A | * | 3/1999 | Iwamura | 725/37 |
|---|---|---|---|---|---|
| 6,032,202 | A | * | 2/2000 | Lea et al. | 710/8 |
| 6,182,094 | B1 | * | 1/2001 | Humpleman et al. | 715/513 |
| 6,199,136 | B1 | * | 3/2001 | Shteyn | 710/305 |
| 6,219,839 | B1 | * | 4/2001 | Sampsell | 725/40 |
| 6,311,243 | B1 | * | 10/2001 | Hamamoto et al. | 710/107 |
| 6,434,447 | B1 | * | 8/2002 | Shteyn | 700/245 |
| 6,779,004 | B1 | * | 8/2004 | Zintel | 709/227 |
| 6,826,632 | B1 | * | 11/2004 | Wugofski | 710/8 |

FOREIGN PATENT DOCUMENTS

| JP | 09247616 A | * | 9/1997 |
|---|---|---|---|
| WO | WO 9749057 A2 | * | 12/1997 |

OTHER PUBLICATIONS

Gavron et al., "How to use Microsoft Windows NT 4 Workstation", published in 1996; pp. 23 and 65.*

* cited by examiner

*Primary Examiner*—Chris Kelley
*Assistant Examiner*—Usha Raman
(74) *Attorney, Agent, or Firm*—Lerner, David, Littenberg, Krumholz & Mentlik, LLP

(57) ABSTRACT

When data is transmitted by using a broadcasting channel of an IEEE1394 interface, it is enabled to cope with a case where undefined equipment is connected to an IEEE1394 bus. The IEEE1394 interface is provided for an IRD, thereby enabling the IRD and equipment such as digital VCR, MD player/recorder, or the like to be connected. A node No. "63" of IEEE1394 is set to the broadcasting channel. Data is transmitted to all equipment connected to the IEEE1394 bus by the broadcasting channel. In the broadcasting channel, a picture plane for selecting a transport stream of MPEG and PCM audio data is displayed, and the data which is transmitted by the broadcasting channel can be selected in accordance with the transport stream of MPEG and the PCM audio data. Thus, when undefined equipment is connected to the IEEE1394 bus, it is possible to cope with any equipment.

23 Claims, 10 Drawing Sheets

| | | | |
|---|---|---|---|
| SET EQUIPMENT | | | 72A |
| | ☑ D-VHS1 | ABC | DVX-10000 |
| | ☑ D-VHS2 | DEF | |
| | ☑ D-VHS3 | GHI | DVX-10000 |
| | ☐ D-VHS | ABC | DVX-10000 |
| | ☐ D-VHS | DEF | |
| | ☑ MD1 | ABC | DVX-10000 |
| | ☑ MD2 | GHI | DVX-10000 |
| | ☐ MD | ABC | DVX-10000 |
| | ☐ PC | CANNOT BE OPERATED | |

71 — ○ D-VHS1 / ○ D-VHS2 / ○ D-VHS3 / ○ MD1 / ○ MD2
72
73 — DECIDE
74 — RETURN

Fig. 6B

| | | | |
|---|---|---|---|
| SET EQUIPMENT | | | 75 |
| | ☑ D-VHS1 | ABC | DVX-10000 |
| | ⊙ D-VHS2 | DEF | |
| | ☑ D-VHS3 | GHI | DVX-10000 |
| | ☐ D-VHS | ABC | DVX-10000 |
| | ☐ D-VHS | DEF | |
| | ☑ MD1 | ABC | DVX-10000 |
| | ☑ MD2 | GHI | DVX-10000 |
| | ☐ MD | ABC | DVX-10000 |
| | ☐ PC | CANNOT BE OPERATED | |

71 — ○ D-VHS1 / ○ D-VHS2 / ○ D-VHS3 / ○ MD1 / ○ MD2
72
73 — DECIDE
74 — RETURN

*Fig. 7A*

SET EQUIPMENT

| | | |
|---|---|---|
| ☑ D-VHS1 | ABC | DVX-10000 |
| ☑ D-VHS2 | DEF | |
| ☑ D-VHS3 | GHI | DVX-10000 |
| ☐ D-VHS | ABC | DVX-10000 |
| ☐ D-VHS | DEF | |
| ☑ MD1 | ABC | DVX-10000 |
| ☑ MD2 | GHI | DVX-10000 |
| ☐ MD | ABC | DVX-10000 |
| ☐ PC CANNOT BE OPERATED | | |

71:
- ○ D-VHS1
- ○ D-VHS2
- ○ D-VHS3
- ○ MD1
- ○ MD2

73 — DECIDE
74 — RETURN
72 — (table)

*Fig. 7B*

SET EQUIPMENT

| | | |
|---|---|---|
| ☑ D-VHS1 | ABC | DVX-10000 |
| ☐ D-VHS | DEF | |
| ☑ D-VHS3 | GHI | DVX-10000 |
| ☐ D-VHS | ABC | DVX-10000 |
| ☐ D-VHS | DEF | |
| ☑ MD1 | ABC | DVX-10000 |
| ☑ MD2 | GHI | DVX-10000 |
| ☐ MD | ABC | DVX-10000 |
| ☐ PC CANNOT BE OPERATED | | |

71:
- ○ D-VHS1
- ○ D-VHS3
- ○ MD1
- ○ MD2

73' — DECIDE
74 — RETURN

*Fig. 7C*

SET EQUIPMENT

| | | |
|---|---|---|
| ☑ D-VHS1 | ABC | DVX-10000 |
| ☐ D-VHS | DEF | |
| ☐ D-VHS3 | GHI | DVX-10000 |
| ☐ D-VHS | ABC | DVX-10000 |
| ☐ D-VHS | DEF | |
| ☑ MD1 | ABC | DVX-10000 |
| ☑ MD2 | GHI | DVX-10000 |
| ☑ MD3 | ABC | DVX-10000 |
| ☐ PC CANNOT BE OPERATED | | |

71:
- ○ D-VHS1
- ○ D-VHS3
- ○ MD1
- ○ MD2
- ○ MD3

73 — DECIDE
74 — RETURN

RECEIVING SYSTEM FOR DIGITAL BROADCASTING, DATA TRANSMITTING METHOD IN DIGITAL BROADCASTING RECEIVING SYSTEM, AND RECEIVING APPARATUS FOR DIGITAL BROADCASTING

BACKGROUND OF THE INVENTION

1. Field of the Invention

The invention relates to a receiving system for a digital broadcasting for receiving a signal in which, for example, video data and audio data are broadcasted by a transport stream of an MPEG (Moving Picture Experts Group) 2 system and transmitting the transport stream to digital signal processing equipment through an interface of IEEE (Institute of Electrical Electronic Engineers) 1394. The invention also relates to a data transmitting method in such a digital broadcasting receiving system and a receiving apparatus for a digital broadcasting which is used for such a system.

2. Description of the Related Art

In recent years, IEEE1394 has been started to spread as an interface to transfer video data and audio data between digital video equipment and digital audio equipment at a high speed. In IEEE1394, an isochronous transfer mode and an asynchronous transfer mode are supported. The isochronous transfer mode is suitable to transfer a time-sequential data stream such as video data or audio data at a high speed. The asynchronous transfer mode is suitable to transfer, for example, various commands or the like.

In recent years, a digital satellite broadcasting has been started to spread. In the digital satellite broadcasting, a digital video signal and an audio signal are compressed by the MPEG2 system, multiplexed by a packet stream, and transmitted. When a digital satellite broadcasting is received, an IRD (Integrated Receiver Decoder) is connected to a television receiver. A signal of a desired program is selected by the IRD and a video signal and an audio signal are decoded. An output of the IRD is supplied to the TV receiver.

A method of providing the interface of IEEE1394 for the IRD to receive such a digital satellite broadcasting has been proposed. When the interface of IEEE1394 is provided for the IRD, the IRD is connected to a digital video recording and reproducing apparatus or an MD recording and reproducing apparatus through the interface of IEEE1394 and a receiving system for the digital satellite broadcasting can be constructed.

In IEEE1394, when data is transferred, an ID number of a node is allocated and a partner is designated by the ID number of the node between equipment connected to a bus of IEEE1394. The number of nodes of one bus is equal to 64 on the IEEE1394 standard. The numbers "0" to "63" are allocated as node ID numbers. The last node number "63" among them is used for broadcasting. In such a system, for example, in case of recording data received by the IRD, equipment on the partner side to record is designated and data is transferred from the IRD to the equipment on the partner side. Therefore, the channel for broadcasting having the node No. "63" is not used generally.

In such a system, however, there is a possibility such that new equipment will be added to the system in future. For example, now assuming that a dedicated decoder is connected to a digital satellite broadcasting and an HDTV picture plane is decoded, there is a possibility such that the decoder is added to the system. In the case where such new equipment is added to the system, since equipment cannot be specified, it is difficult to allocate the node number and transmit data.

To prepare for a situation such that such equipment which cannot be specified is connected, therefore, a method of enabling a broadcasting channel to be used is considered. In the broadcasting channel, since it is connected to the bus and data is sent to all equipment, the data can be transmitted without specifying equipment.

In case of enabling the data to be transmitted by using the broadcasting channel as mentioned above, it is necessary to also enable the data to be transmitted to undefined equipment. For example, among digital video tape recording/reproducing apparatuses, there is equipment which can receive and record a transport stream of MPEG as it is. It is necessary to transfer data to such equipment by the transport stream of MPEG. However, in digital audio equipment such as an MD recording/reproducing apparatus, even if the MPEG transport stream is received, it cannot be decoded. It is, therefore, necessary to transfer PCM audio data to such equipment.

As mentioned above, even if the broadcasting channel can be used, if the kind of data which is used in the broadcasting channel cannot be set, it is impossible to cope with a case where new undefined equipment is connected.

OBJECTS AND SUMMARY OF THE INVENTION

The invention, therefore, intends to provide a receiving system for a digital broadcasting, in which when data is transmitted by using a broadcasting channel, it is possible to cope with various equipment and to provide a data transmitting method in such a digital broadcasting receiving system and a receiving apparatus for a digital broadcasting.

According to the invention, there is provided a receiving system for a digital broadcasting, comprising: digital broadcasting receiving equipment for receiving a digital broadcasting which is transmitted by a transport stream in which video data and audio data have been compressed and decoding the reception signal of the digital broadcasting; and a plurality of digital signal processing equipment each for processing a digital signal, in which the digital broadcasting receiving equipment and the plurality of digital signal processing equipment are connected through an interface, and the digital signal is transmitted and received between the digital broadcasting receiving equipment and the plurality of digital signal processing equipment, wherein when data is transmitted to the plurality of digital signal processing equipment by a broadcasting channel through the interface, the digital broadcasting receiving equipment enables the data which is transmitted by the broadcasting channel to be selected in accordance with a transport packet and PCM audio data.

According to the invention, there is provided a data transmitting method in a digital broadcasting receiving system, wherein digital broadcasting receiving equipment for receiving a digital broadcasting which is transmitted by a transport stream in which video data and audio data have been compressed and decoding the reception signal of the digital broadcasting and a plurality of digital signal processing equipment each for processing a digital signal are connected through an interface to thereby enable the digital signal to be transmitted and received, when data is transmitted to the plurality of digital signal processing equipment by a broadcasting channel through the interface, the data which is transmitted by the broadcasting channel is selected in accordance with a transport packet and a PCM audio data and transmitted.

According to the invention, there is provided a receiving apparatus for a digital broadcasting, for receiving a digital broadcasting which is transmitted by a transport stream in which video data and audio data have been compressed and decoding the digital broadcasting, wherein the receiving apparatus has an interface for transmitting and receiving data to/from a plurality of digital signal processing equipment each for processing a digital signal, and the interface has selecting means for, when data is transmitted to the plurality of digital signal processing equipment by a broadcasting channel, selecting the data which is transmitted by the broadcasting channel in accordance with a transport packet and a PCM audio data.

According to the invention, the node No. "63" of IEEE1394 can be set to the broadcasting channel. Since data is transmitted to all equipment by the broadcasting channel, data can be also transferred to undefined equipment. In the broadcasting channel, since the transport stream of MPEG and the PCM audio can be selected, when the undefined equipment is connected to the IEEE1394 bus, it is possible to cope with any equipment.

The above and other objects and features of the present invention will become apparent from the following detailed description and the appended claims with reference to the accompanying drawings.

DETAILED DESCRIPTION OF THE PREFERRED EMBODIMENT

Figure 1:
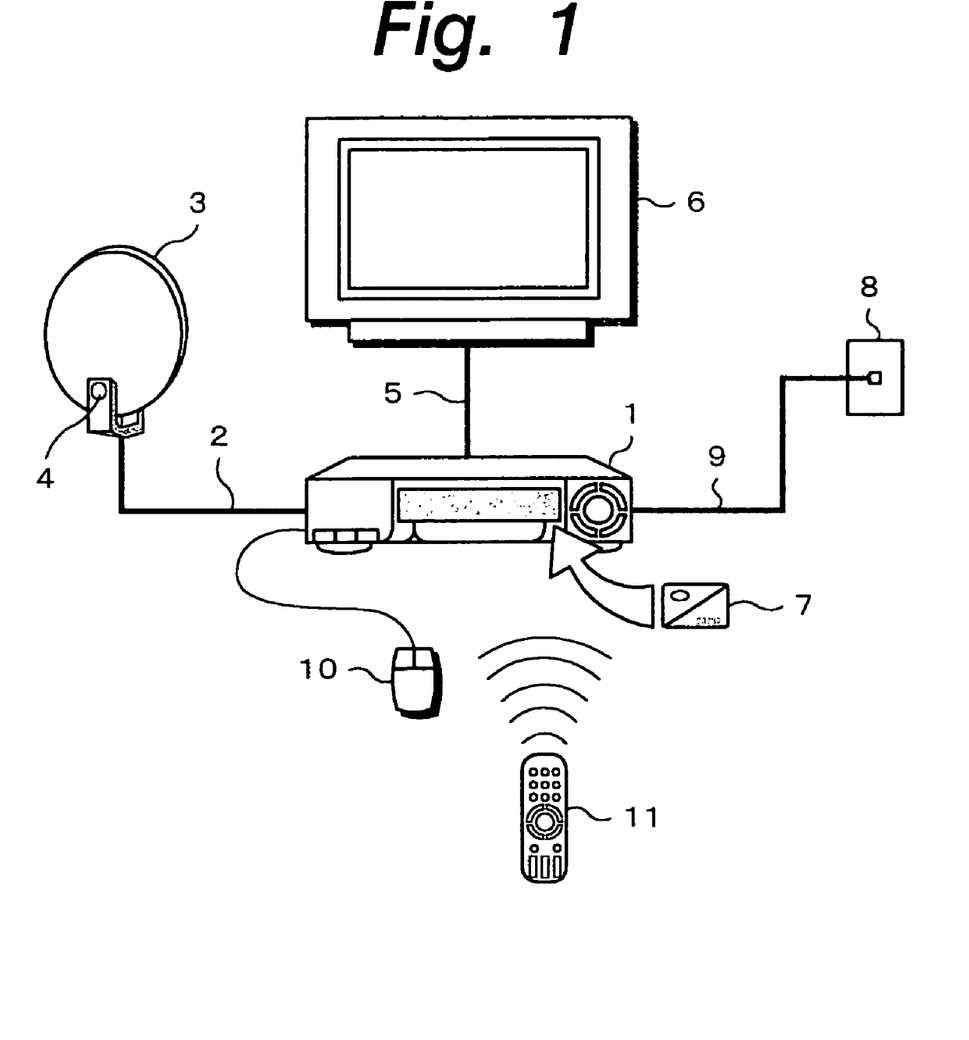
FIG. 1 is a schematic diagram of an example of a receiving system for a digital satellite broadcasting to which the invention is applied.

An embodiment of the invention will now be described hereinbelow with reference to the drawings. In FIG. 1, reference numeral 1 denotes an IRD. The IRD 1 decodes a reception signal of a digital satellite broadcasting and forms a video signal and an audio signal of, for example, the NTSC system. An antenna terminal of the IRD 1 is connected through a cable 2 to a low-noise converter 4 attached to a parabolic antenna 3. A radio wave from a satellite is transmitted by, for example, a band of 12 GHz. The radio wave from the satellite is received by the parabolic antenna 3 and converted into a signal of, for example, a band of 1 GHz by the low-noise converter 4 attached to the parabolic antenna 3.

An output of the low-noise converter 4 is supplied to the antenna terminal of the IRD 1 through the cable 2. In the IRD 1, a signal of a desired carrier wave is selected from the reception signal and a transport stream of MPEG2 is demodulated. A video packet and an audio packet of a desired program are extracted from the transport stream and decoded. For example, the video signal and audio signal of the NTSC system are decoded.

The video signal and audio signal from the IRD 1 are supplied to a television receiver 6 through a cable 5. A reception picture plane of a desired satellite broadcasting program is displayed and its audio sound is generated by the TV receiver 6.

An IC card 7 is inserted into the IRD 1. Reception information is stored into the IC card 7. The IRD 1 is connected to a telephone line distributor 8 through a cable 9 and charging information is sent to the IRD 1 through a telephone line.

The IRD 1 is operated by a remote controller 11. When a video mouse 10 is attached, the user can set a reservation program while observing the picture plane which is displayed to the TV receiver 6.

Figure 2:
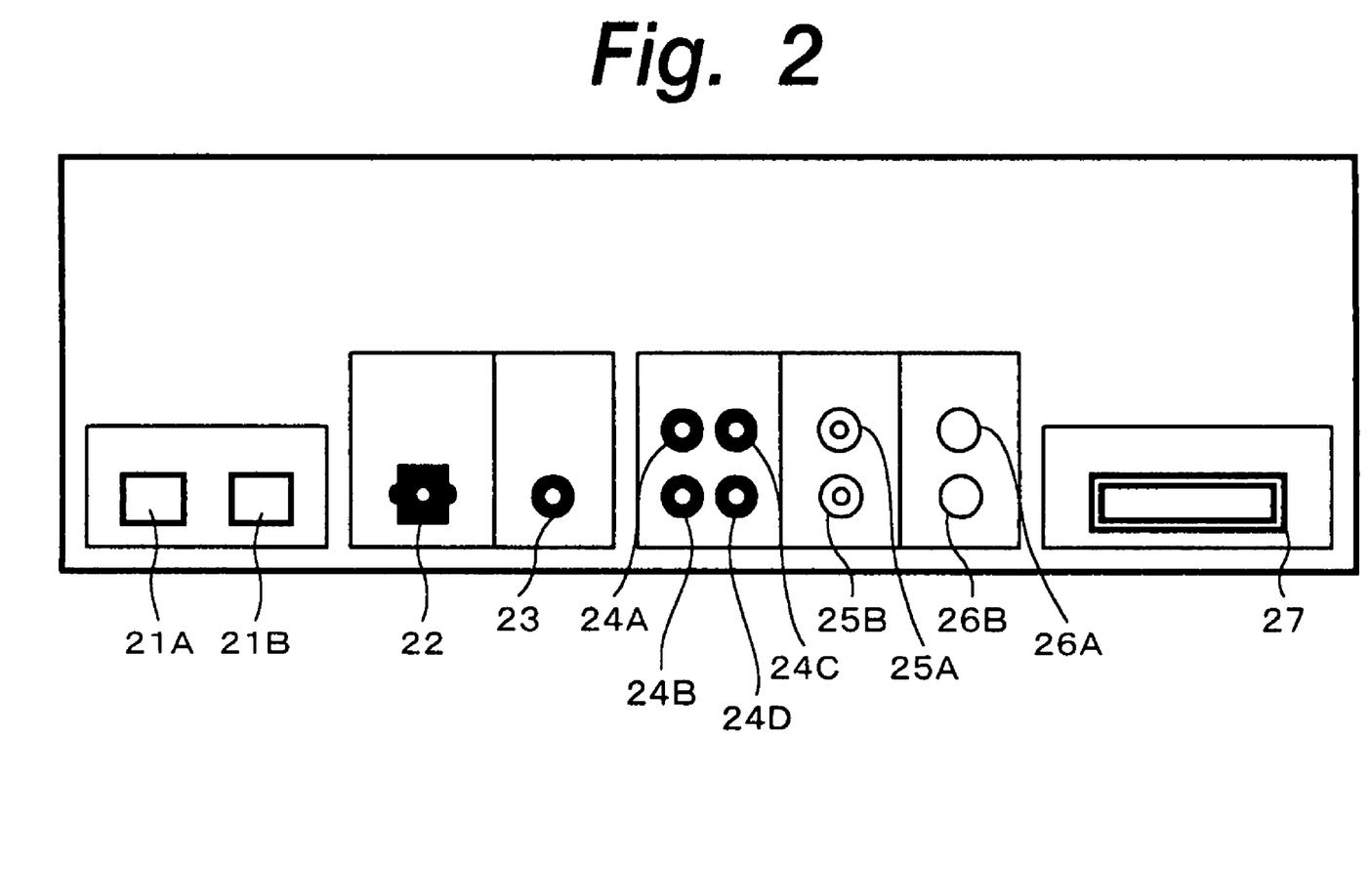
FIG. 2 is a rear view showing a rear panel of an IRD in the receiving system for the digital satellite broadcasting to which the invention is applied.

As shown in FIG. 2, a rear panel of the IRD 1 is equipped with: terminals 21A and 21B of IEEE1394; an optical digital audio output terminal 22; an MD mouse terminal 23; analog audio output terminals 24A to 24D; video output terminals 25A and 25B; S video output terminals 26A and 26B; and a data output high-speed parallel terminal 27.

The terminals 21A and 21B of IEEE1394 are provided to perform a data transfer by using the interface of IEEE1394. An isochronous transfer mode and an asynchronous transfer mode are supported in IEEE1394. A delay time of a data transfer is guaranteed in the isochronous transfer mode. In the isochronous transfer mode, a time-sequential data stream such as video data or audio data can be transferred at a high speed. In the asynchronous transfer mode, data such as various commands or the like is transferred.

A digital audio signal is outputted from the optical digital audio output terminal 22 by using an optical cable of IEC958. The optical digital audio output terminal 22 is used to connect digital audio equipment or the like having the optical cable of IEC958. The analog audio output terminals 24A to 24D are used to output an analog audio signal. The video output terminals 25A and 25B and S video output terminals 26A and 26B are used to output a demodulated video signal.

Figure 3:
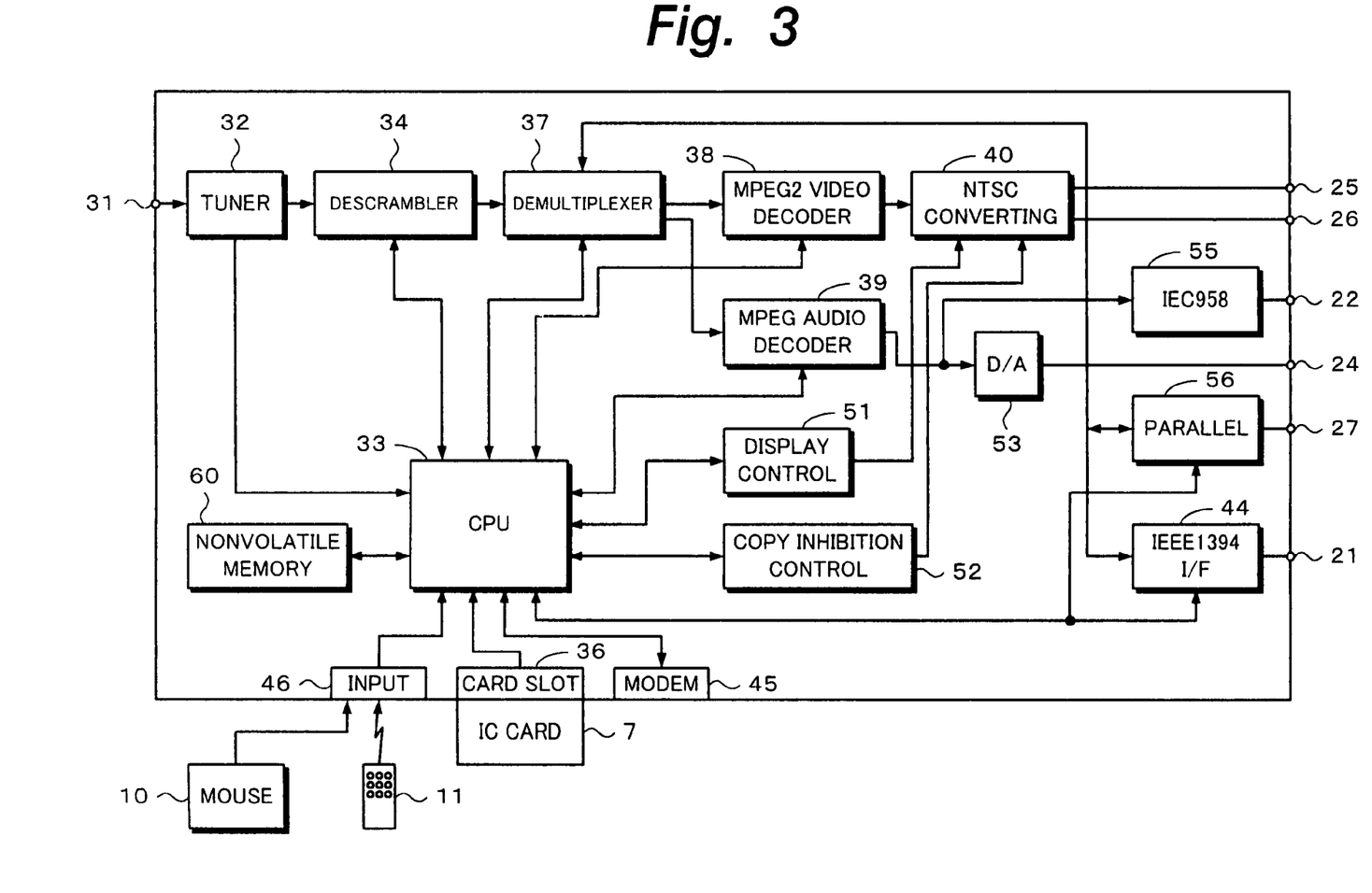
FIG. 3 is a block diagram showing a construction of the IRD in the receiving system for a digital satellite broadcasting to which the invention is applied.

FIG. 3 shows a construction of the IRD 1. As shown in FIG. 1, a radio wave of a digital satellite broadcasting sent by a radio wave of a band of, for instance, 12 GHz through a satellite is received by the parabolic antenna 3 and converted into a signal of a band of 1 GHz by the low-noise converter 4 attached to the parabolic antenna 3. An output of the low-noise converter 4 is supplied to an antenna terminal 31 of the IRD 1 through the cable 2. A signal from the antenna terminal 31 is supplied to a tuner circuit 32.

The tuner circuit 32 comprises: a frequency selecting circuit to select a signal of a predetermined carrier frequency from the reception signal; a demodulating circuit for performing a QPSK (Quadrature Phase Shift Keying) demodulating process; and an error correction processing circuit. In the tuner circuit 32, a signal of a desired carrier frequency is selected from the reception signal on the basis of a setting signal from a CPU (Central Processing Unit) 33 for control. The reception signal is QPSK (Quadrature Phase Shift Keying) demodulated and, further, subjected to an error correcting process.

An output of the tuner circuit 32 is supplied to a descrambler 34. Received ECM (Entitlement Control Message) data and EMM (Entitlement Management Message) data are inputted to the descrambler 34. Key data for descrambling stored in the IC card 7 inserted in an IC card slot 36 is also supplied. The descrambler 34 descrambles an MPEG transport stream by using the received ECM data and EMM data and the key data of the IC card 7. The descrambled transport stream of MPEG2 is sent to a demultiplexer 37.

The demultiplexer 37 separates a desired packet from the stream from the descrambler 34 on the basis of a command from the CPU 33. A packet identifier (PID) is provided in a header portion of the transmitted packet. The demultiplexer 37 extracts a video packet and an audio packet of a desired program on the basis of the PID. The video packet of the desired program is sent to an MPEG2 video decoder 38. The audio packet is sent to an MPEG audio decoder 39.

The MPEG2 video decoder 38 receives the packet of the video signal from the demultiplexer 37 and performs a decoding process of the MPEG2 system, thereby forming video data. The video data is supplied to an NTSC converting circuit 40. In the NTSC converting circuit 40, the video data decoded by the MPEG2 video decoder 38 is converted into a video signal of the NTSC system.

A display control circuit 51 and a copy inhibition control circuit 52 are provided for the NTSC converting circuit 40. The display control circuit 51 allows various display picture planes to be generated on a screen. The copy inhibition control circuit 52 generates a copy inhibition control signal as necessary in order to protect the copyright of a video image.

An output of the NTSC converting circuit 40 is supplied to the analog video output terminals 25 and S video output terminals 26. An analog video signal of the NTSC system is outputted from the analog video output terminals 25 and an S video signal is outputted from the S video output terminals 26.

The MPEG audio decoder 39 receives the audio packet from the demultiplexer 37 and performs an audio decoding process of the MPEG system, thereby forming audio data before data compression. The decoded audio data is outputted from the optical digital audio output terminal 22 through an IEC958 interface circuit 55, converted into an analog audio signal by a D/A converter 53, and thereafter, supplied to the analog audio output terminals 24.

An input to the IRD 1 is supplied from an input unit 46. The remote controller 11, a video mouse, or the MD mouse 10 is prepared as an input unit 46. A modem 45 is provided and charging information is sent by the modem 45 via a telephone line.

A carrier frequency of the reception signal is set on the basis of a channel setting signal inputted by the viewer. When a desired program is set, a receiving frequency of the tuner circuit 32 is set to a predetermined carrier frequency by referring to an NIT (Network Information Table). A packet of the PID in a PMT (Program Map Table) as information regarding a desired channel is extracted with reference to a PAT (Program Association Table) as information regarding a channel at the carrier frequency. The video image, audio sound, and PID of a packet of additional data of a desired channel are obtained by referring to the PMT.

An interface 44 of IEEE1394 is provided for the IRD 1. A transport stream or PCM audio data can be inputted and outputted between the demultiplexer 37 and interface 44 of IEEE1394.

An interface 56 for high-speed parallel data is further provided for the IRD 1. The transport stream or PCM audio data can be inputted and outputted through the high-speed parallel data interface 56.

Figure 4:
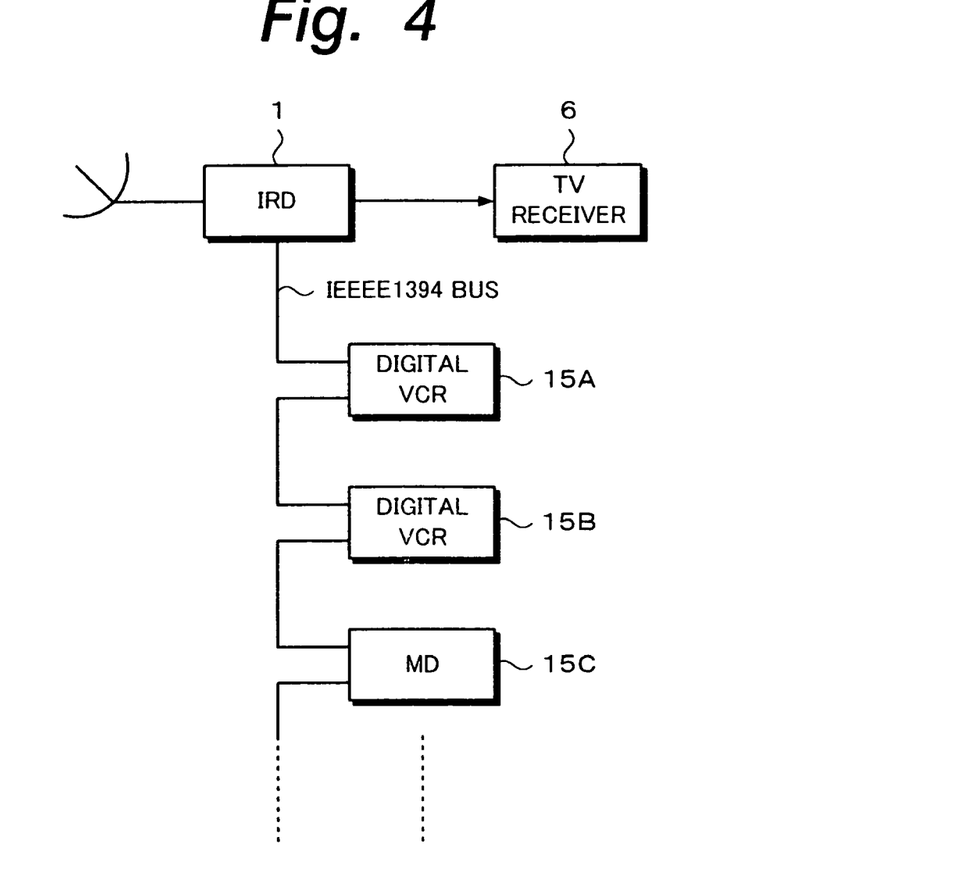
FIG. 4 is a block diagram for use in explanation of the receiving system for a digital satellite broadcasting to which the invention is applied.

As mentioned above, the interface 44 of IEEE1394 is provided for the IRD 1 to which the invention is applied. By using the interface 44 of IEEE1394, as shown in FIG. 4, other digital equipment 15A, 15B, 15C, . . . which can perform the digital recording, for example, a digital video recording and reproducing apparatus, an MD recording and reproducing apparatus, and the like are connected to the IRD 1.

In IEEE1394, there are "0" to "63" as node ID numbers. The last node number "63" among them is used as a broadcasting channel. The ID number of the node is automatically allocated when the equipment is connected to the bus of IEEE1394. In this instance, up to five equipment among the equipment connected to the bus are registered and the ID numbers of the nodes are allocated to the registered equipment. The number of corresponding equipment which are connected is limited to 5 or less.

Figure 5:
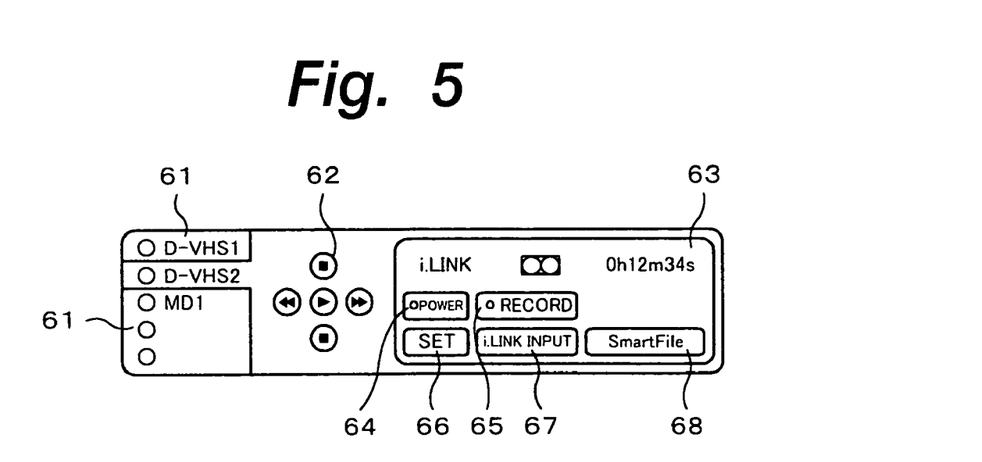
FIG. 5 is a schematic diagram for use in explanation of a control panel display in the IRD in the receiving system for a digital satellite broadcasting to which the invention is applied.

The registered equipment can be changed by shifting the picture plane from a display of a control panel as shown in FIG. 5 to a picture plane for changing the setting by pressing a "set" button 66. In the display of the control panel, there are provided: an equipment selection display 61; a "function" button display 62; a state display 63; a "power" button 64; a "record" button 65; a "set" button 66; an IEEE1394 input switching button 67 (IEEE1394 is displayed as i.LINK); and a "smart file" executing button 68. Names of the five registered equipment of IEEE1394 are shown in the equipment selection display 61. Desired equipment can be selected from the five equipment by the equipment selection button 61.

Figure 6A:
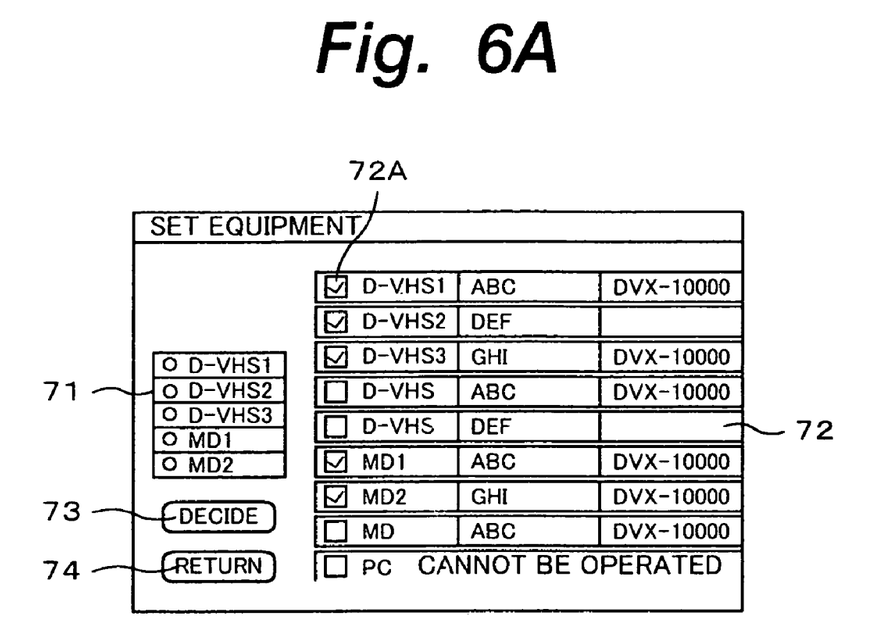
FIGS. 6A and 6B are schematic diagrams for use in explanation of a setting display in the IRD in the receiving system for a digital satellite broadcasting to which the invention is applied.
Figure 6B:
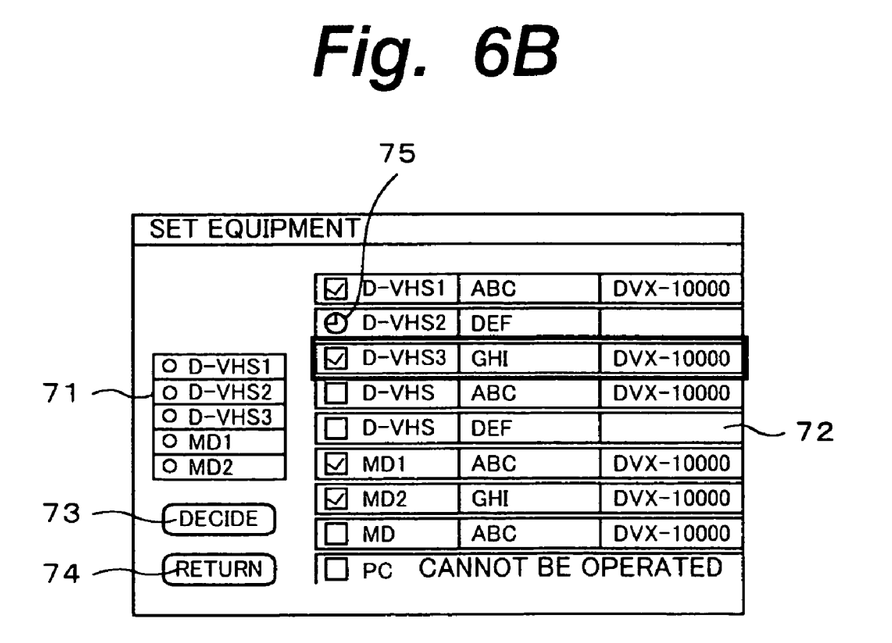

When the "set" button 66 is pressed from the display of the control panel, a setting picture plane as shown in FIGS. 6A and 6B is displayed.

As shown in FIG. 6A, a registered equipment display 71, a connected equipment display 72, a "decide" button 73, and a "return" button 74 are displayed on a set changing picture plane.

Up to five equipment to which the ID numbers were allocated as nodes of IEEE1394 are displayed on the registered equipment display 71. The equipment displayed brightly among them denotes the equipment connected physically to the bus. When the registered equipment is disconnected from the bus, the display of the registration name becomes dim. When the registered equipment is connected again to the bus, the display of the registration name becomes bright.

As for the five equipment which are connected through the bus of IEEE1394, five equipment which were connected early are first automatically registered. If five equipment have already been registered, the sixth and subsequent equipment are not registered.

In case of changing or removing the equipment which is connected through the bus of IEEE1394, a check mark is adhered to a check box 72A in the connected equipment display 72. The equipment to which the check mark has been adhered becomes a target of registration. The equipment to which the check mark is not adhered is excluded from a target of registration. In this instance, the equipment in which the reservation recording has been set and the connected equipment cannot be changed. This is because if the equipment in which the reservation recording has been set and the connected equipment are excluded, an inconvenience such that the reservation recording cannot be performed or data cannot be transmitted occurs.

As shown in FIG. 6B, for instance, a reservation mark 75 like a clock mark is displayed on the equipment in which the reservation recording has been set. In the equipment in which the reservation mark 75 has been displayed, the check mark of the check box 72A cannot be removed.

Figure 7A:
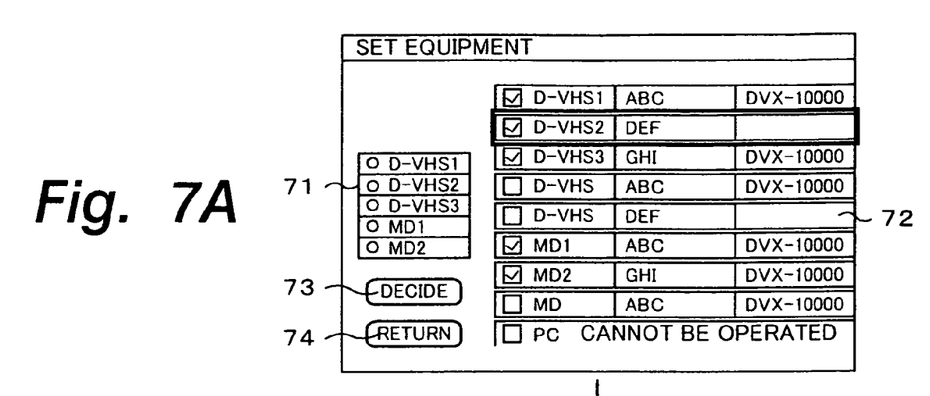
FIGS. 7A to 7C are schematic diagrams for use in explanation of a setting display in the IRD in the receiving system for a digital satellite broadcasting to which the invention is applied.
Figure 7B:
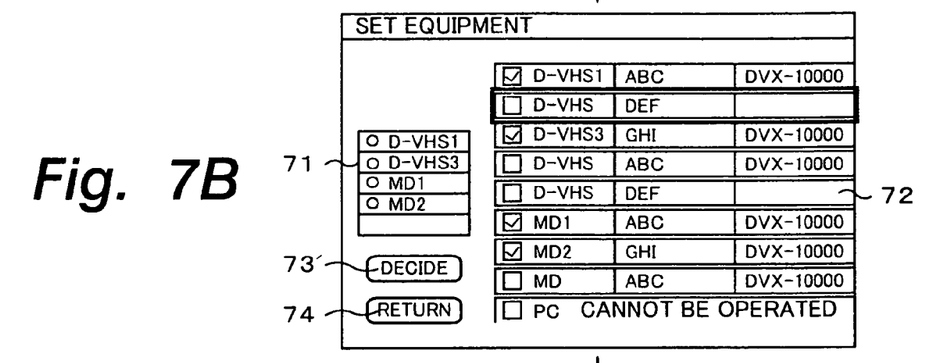
Figure 7C:
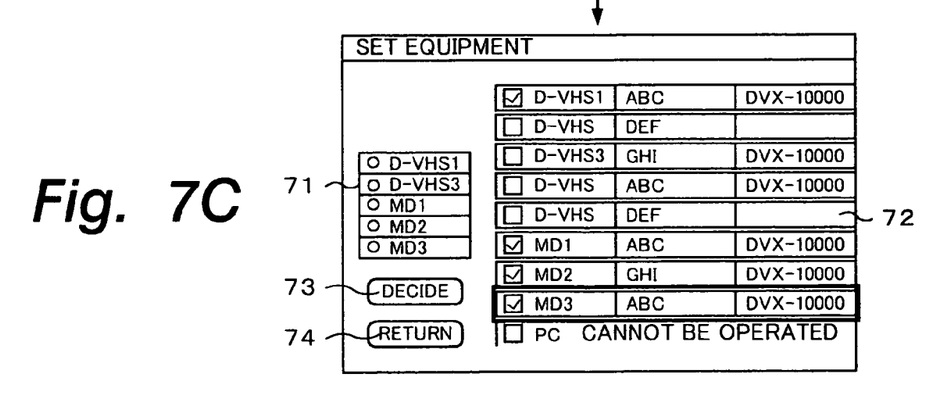

FIGS. 7A to 7C show processes in case of changing the registered equipment and show a case where, for example, the equipment of D-VHS2 is changed to the equipment of MD3. As shown in FIG. 7A, first, a cursor is moved to a position of the equipment of D-VHS2. Subsequently, the "decide" button 73 is pressed. When the "decide" button 73 is pressed at this position, the check mark of D-VHS2 is removed as shown in FIG. 7B. After that, the cursor is moved to a position of equipment which the user wants to newly register. The "decide" button 73 is pressed at this position. Thus, the check mark is adhered to the position of MD3 as shown in FIG. 7C. After the check mark is changed and the setting picture plane is finished by pressing the "return" button 74 in this manner, the equipment to which the check mark has newly been adhered is registered.

The expression of "VHS". "MD", or the like shows the kind of equipment. When the same kind of equipment is registered, the equipment is identified by the number written after such an expression. When the registration of the equipment is changed, the number subsequent to the expression showing the kind of equipment is changed in accordance with the change.

Figure 8A:
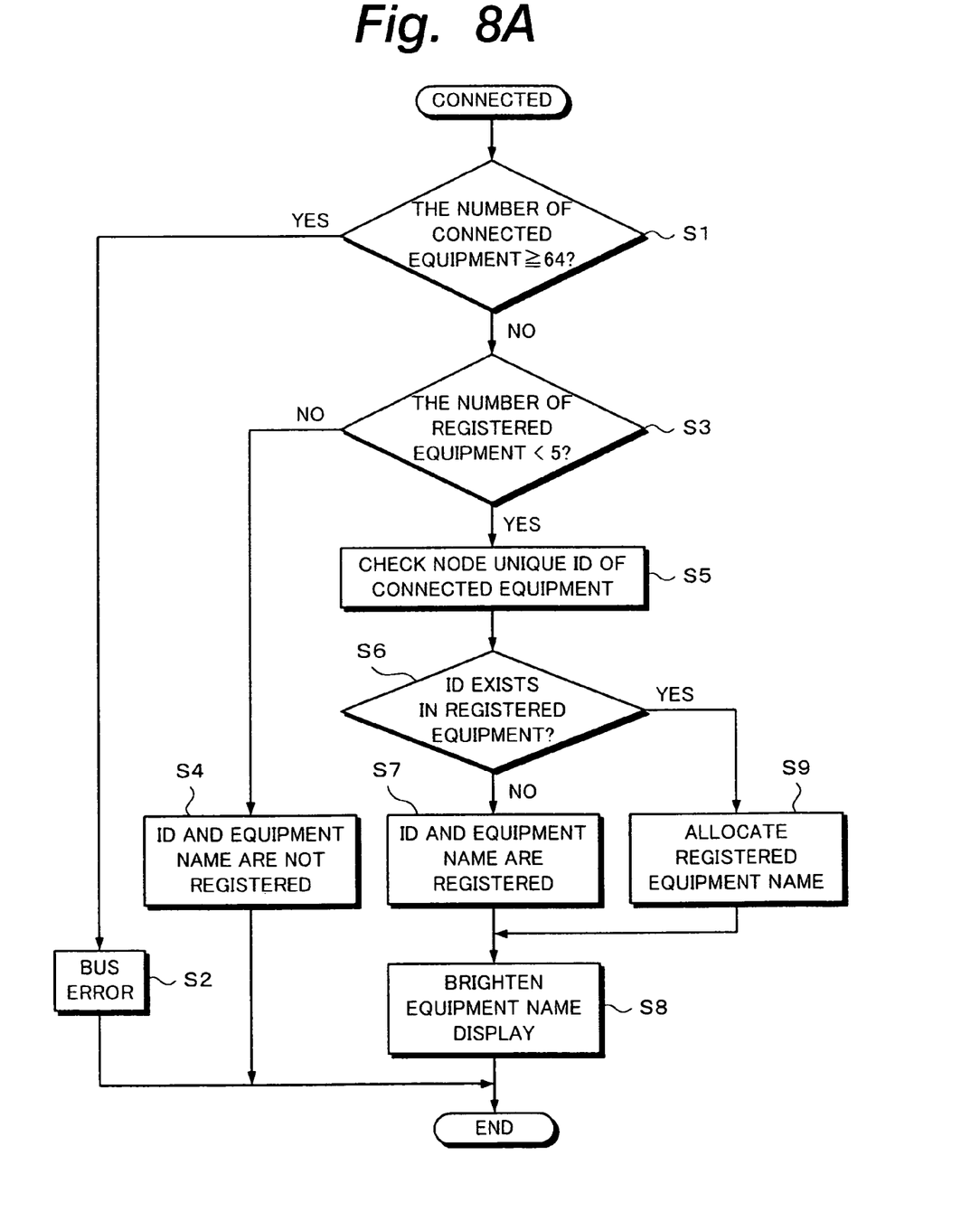
FIGS. 8A and 8B are flowcharts for use in explanation of a registration of equipment in the receiving system for a digital satellite broadcasting to which the invention is applied.

FIGS. 8A and 8B are flowcharts for performing the processes as mentioned above and show an automatic registering process of equipment. As shown in FIG. 8A, when the equipment is connected, whether the number of connected equipment is equal to or larger than 64 or not is discriminated (step S1). If the number of connected equipment is equal to or larger than 64, it is determined that there is a bus error (step S2) and the processing routine is finished. If the number of equipment connected to the bus is smaller than 64 in step S1, whether the number of registered equipment is smaller than 5 or not is discriminated (step 3). If the number of registered equipment is equal to or larger than 5, the ID numbers of the nodes and the equipment names are not registered (step S4), the processing routine is finished.

If the number of equipment connected to the bus is smaller than 5 in step S3, the unique ID numbers of the nodes of the equipment connected to the bus are discriminated (step S5). Whether there is the equipment having the ID number among the registered equipment or not is discriminated (step S6).

If the equipment having the same ID number as that of the connected equipment cannot be found among the registered equipment, the ID number and the equipment name are newly registered (step S7). This equipment name is brightly displayed (step S8).

If the equipment having the same ID number as that of the connected equipment exists among the already registered equipment, the name of the registered equipment is allocated (step S9). This equipment name is brightly displayed (step S8).

Figure 8B:
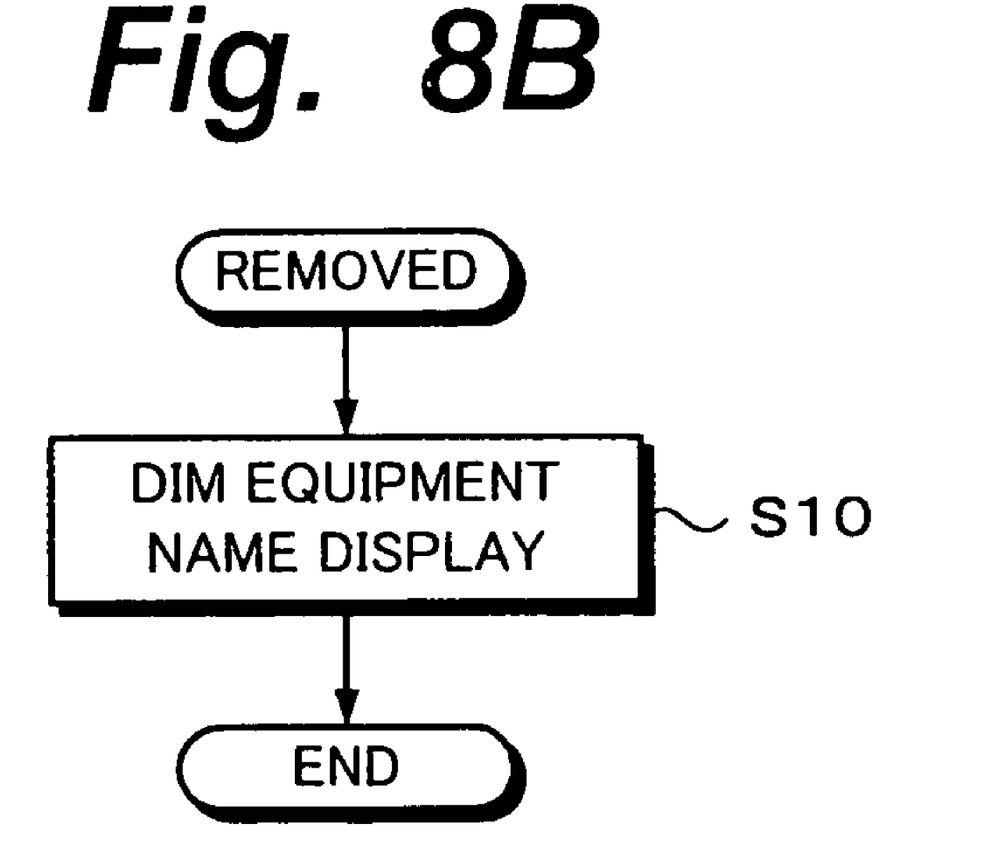

As shown in FIG. 8B, when the connected equipment is disconnected from the bus of IEEE1394 and enters a non-connecting state, the equipment name is dimly displayed (step S10).

Figure 9:
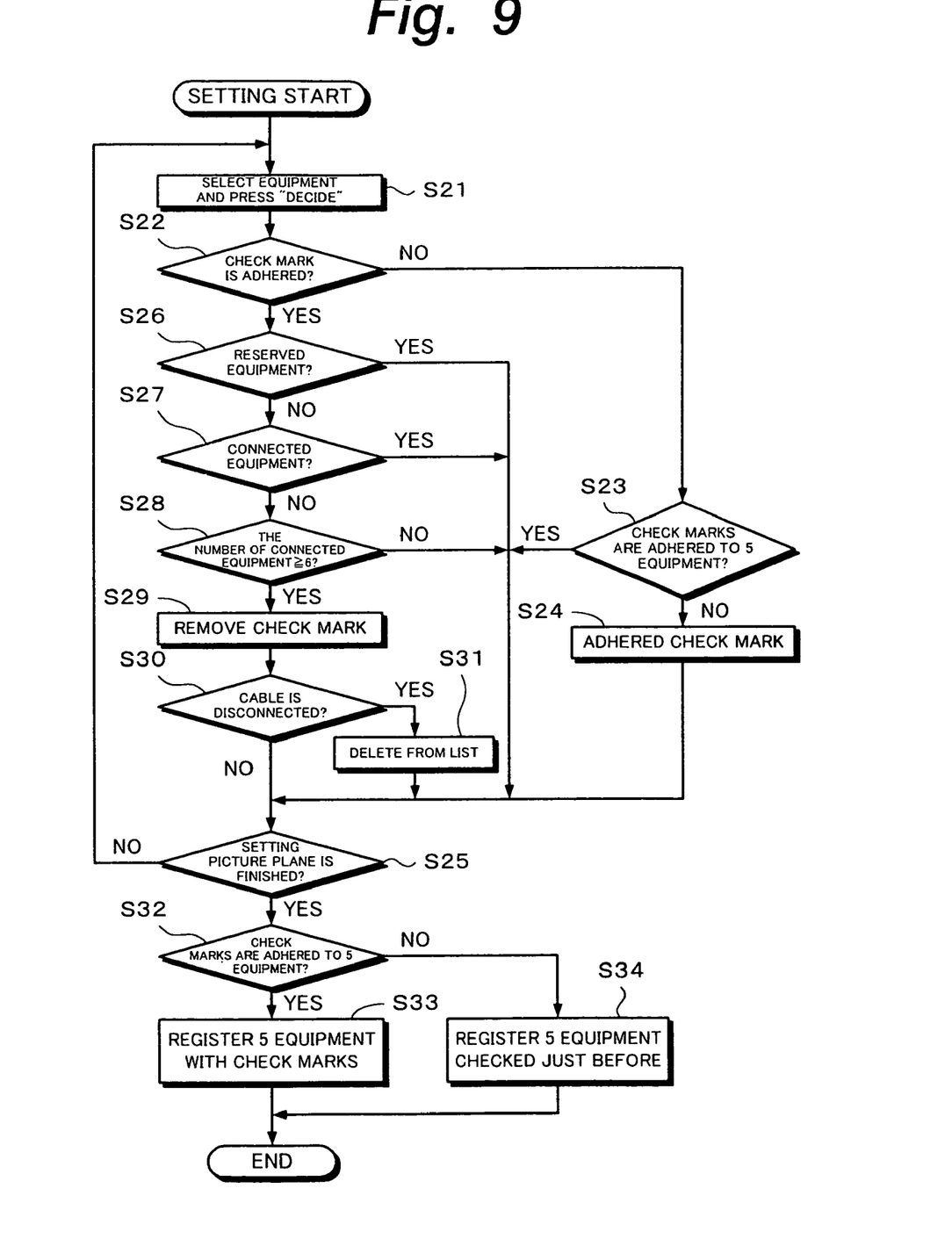
FIG. 9 is a flowchart for use in explanation of a registration of equipment in the receiving system for a digital satellite broadcasting to which the invention is applied.

FIG. 9 is a flowchart showing processes when the registered equipment is changed. In FIG. 9, when the equipment is selected and the "decide" button 73 is pressed (step S21), whether the check mark has been adhered so far or not is discriminated (step S22).

If the check mark is not adhered so far, whether the check marks have been adhered to five equipment or not is discriminated (step S23). If the check marks are not adhered to five equipment, the check marks are adhered to those equipment (step S24). A check is made to see if the setting picture plane is finished (step S25). If the setting picture plane is not finished, the processing routine is returned to step S21.

If it is decided in step S23 that the check marks have been adhered to the five equipment, the check marks are not changed but step S25 follows and whether the setting picture plane is finished or not is discriminated. If the setting picture plane is not finished, the processing routine is returned to step S21.

If it is decided in step S22 that the check marks have been adhered so far, whether the program reservation has been made to the equipment or not is discriminated (step S26). Since the registration cannot be reset in the equipment in which the program has been reserved, if it is the reserved equipment, the check marks are not changed but step S25 follows. Whether the setting picture plane is finished or not is discriminated. If the setting picture plane is not finished, the processing routine is returned to step S21.

If it is decided in step S26 that the equipment is not the reserved equipment, whether the equipment has been connected or not is discriminated (step S27). Since the registration cannot be reset in the connected equipment, in case of the connected equipment, the check marks are not changed but step S25 follows and whether the setting picture plane is finished or not is discriminated. If the setting picture plane is not finished, the processing routine is returned to step S21.

If it is determined in step S27 that the equipment is not the connected equipment, whether the number of equipment units connected to the bus is equal to or larger than 6 is discriminated (step S28). Since up to five equipment units can be registered, if less than six equipment units are connected to the bus, the check marks are not changed but step S25 follows whereby it is determined whether or not the setting picture plane is finished. If the setting picture plane is not finished, the processing routine is returned to step S21.

When it is decided in step S28 that the number of connected equipment is equal to or larger than 6, the check marks are removed (step 529). Whether the cable has been disconnected or not is discriminated (step 530). If the cable is disconnected, the equipment is deleted from the list (step S31). If the cable is not disconnected, step S25 follows and whether the setting picture plane is finished or not is discriminated. If the setting picture plane is not finished, the processing routine is returned to step S21.

By the processes as mentioned above, when the equipment is selected and the "decide" button 73 is pressed, if the check marks have been adhered so far, the check marks are removed. If no check mark is adhered, the check mark is adhered. At this time, the reserved equipment or connected equipment is controlled so as not to remove the check mark. The number of equipment to which the check marks have been adhered is controlled to become 5.

When the "return" button 74 is pressed in step S25, the setting picture plane is finished and the screen is returned to the control panel. In this instance, whether the check marks have been adhered to the five equipment or not is discriminated (step S32). If the check marks have been adhered to the five equipment, the five equipment with the check marks are registered (step S33). If the check marks are not adhered to the five equipment, the five equipment checked just before are registered (step S34).

The broadcasting channel of the ID No. "63" can be used for preparation for a case where undefined equipment is connected. In the broadcasting channel, the transport packet of MPEG and the PCM audio data can be selected. Now, assuming that the bus output of IEEE1394 at the time of non-connection is an MPEG stream, the MPEG transport stream is transmitted by the broadcasting channel. Now, assuming that the bus output of IEEE1394 at the time of non-connection is a PCM audio stream, the PCM audio data is transmitted by the broadcasting channel.

Figure 10:
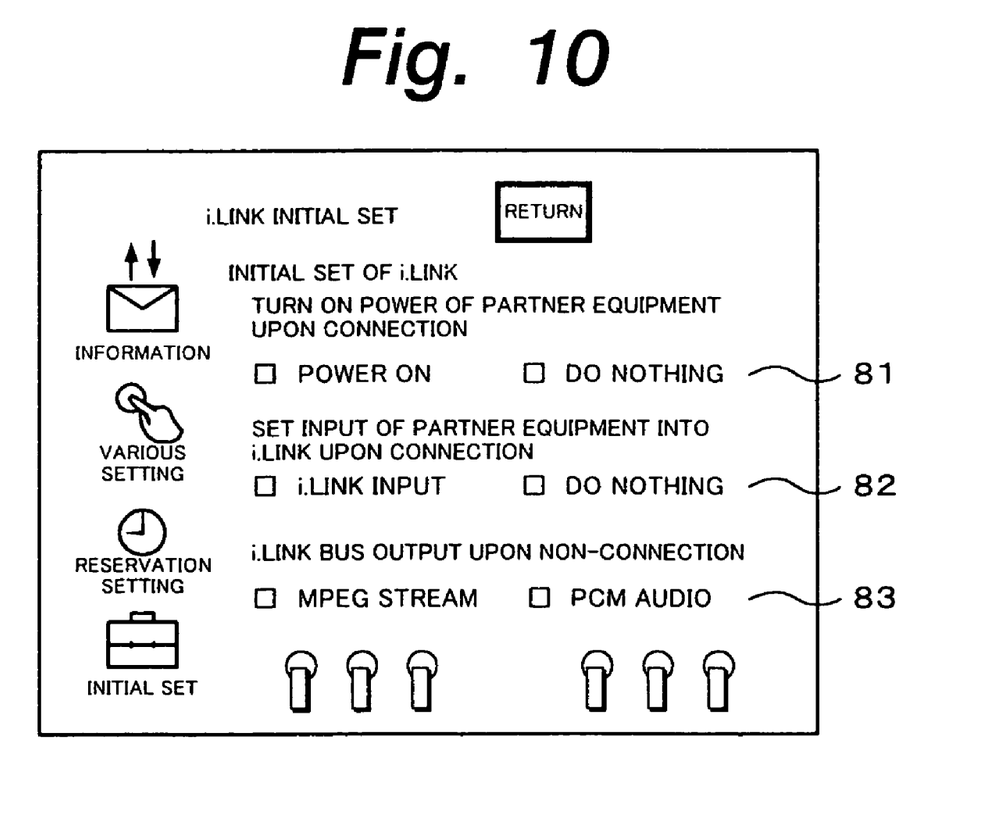
FIG. 10 is a schematic diagram for use in explanation of broadcasting in the receiving system for a digital satellite broadcasting to which the invention is applied.

FIG. 10 shows a picture plane for initial setting of IEEE1394. As shown in FIG. 10, a selection display 81 to discriminate whether a power source of partner equipment is turned on at the time of connection or not, a selection display 82 to discriminate whether the partner equipment is set to an IEEE1394 input upon connection or not, and a selection display 83 to discriminate whether a bus output of IEEE1394 upon non-connection is set to the MPEG stream or PCM audio data are displayed on the initial setting picture plane. When the MPEG stream side is selected on the selection display 82, the transport stream of MPEG is transmitted by the broadcasting channel. When the PCM audio is selected, the PCM audio data is transmitted by the broadcasting channel.

As mentioned above, the MPEG transport stream and the PCM audio data can be selected on the broadcasting channel. That is, the video data, audio data, and control data compressed by the MPEG system can be transmitted by a packet of the MPEG transport stream. Even in case of the other data, data which is multiplexed to the transport stream can be transmitted by a packet of the transport stream. Data such that a compression system differs from the MPEG system as in case of the MD recording and reproducing apparatus can be transmitted as PCM audio data.

The present invention is not limited to the foregoing embodiments but many modifications and variations are possible within the spirit and scope of the appended claims of the invention.

What is claimed is:

1. A system for receiving a digital broadcast signal, comprising:
   a digital broadcast receiving apparatus; and
   a plurality of digital signal processing equipment connected to said digital broadcast receiving apparatus said digital broadcast receiving apparatus including:
   a receiver operable to receive the digital broadcast signal,
   a decoder operable to decode the received signal into decoded data selected from the group consisting of pulse code modulated (PCM) audio data and compressed video and audio data,
   an interface operable to transmit data to and receive data from at least one of said plurality of digital signal processing equipment, the transmitted data including the decoded data, and
   a picture plane operable to display at least one of a control panel and a registration panel,
   said control panel including an equipment selection region and an operation selection region, said equipment selection region displaying a list of registered ones of said connected digital signal processing equipment and an associated button area for each of said registered digital signal processing equipment whereby at least one of said registered digital signal processing equipment is selected from the list by selecting its associated button area,
   said registration panel including a connected equipment region and a registered equipment region, said registered equipment region displaying the list of said registered digital signal processing equipment, said connected equipment region displaying a list of said connected digital signal processing equipment and an associated mark area for each of said connected digital signal processing equipment, said mark area indicating whether the associated one of said connected digital signal processing equipment is registered or unregistered whereby changing the indication in a given mark area registers or unregisters its associated digital signal processing equipment and thereby adds the associated digital signal processing equipment to or removes the associated digital signal processing equipment from the list of said registered digital signal processing equipment that is displayed in said registered equipment region of said registration panel and that is displayed in said equipment selection region of said control panel, wherein when the number of the registered digital signal processing equipment is less than a maximum number of registered digital signal processing equipment, the associated digital signal processing equipment may be registered, and when the number of the registered digital signal processing equipment is the maximum number of registered digital signal processing equipment, the associated digital signal processing equipment may not be registered until at least one of the registered digital signal processing equipment is unregistered or disconnected from said digital broadcast receiving apparatus, the maximum number of registered digital signal processing equipment being less than a maximum number of connected digital signal processing equipment.

2. A system according to claim 1, wherein the compressed video data and audio data are compressed according to an MPEG2 standard.

3. A system according to claim 1, wherein said interface is an IEEE1394 interface.

4. A system according to claim 1, wherein when the mark area associated with a given one of the registered digital signal processing equipment indicates that the given digital signal processing equipment is reserved for a future operation, the indication in the mark area cannot be changed.

5. A system according to claim 1, wherein when the number of the connected digital signal processing equipment is less than a predefined value, a given one of the registered digital signal processing equipment may not be unregistered.

6. A system according to claim 1, wherein when a given one of the registered digital signal processing equipment is disconnected from said digital broadcast receiving apparatus, the display of the given digital signal processing equipment in said control panel is dimmed.

7. A system according to claim 1, wherein when a given one of the connected digital signal processing equipment is disconnected from said digital broadcast receiving apparatus, the display of the given digital signal processing equipment in said registration panel is dimmed.

8. A system according to claim 1, wherein said operation selection region includes a plurality of function button areas.

9. A system according to claim 1, wherein said control panel includes a button area for changing from said control panel to said registration panel, and said registration panel includes a further button area for changing from said registration panel to said control panel.

10. An apparatus for delivering digital signals to and receiving digital signals from a plurality of digital signal processing equipment connected to the apparatus, comprising:
   a receiver operable to receive a digital broadcast signal;
   a decoder operable to decode the received signal into decoded data selected from the group consisting of compressed video and audio data and pulse code modulated (PCM) audio data;
   an interface operable to transmit data to and receive data from at least one of the plurality of connected digital signal processing equipment, the transmitted data including the decoded data; and
   a picture plane operable to display at least one of a control panel and a registration panel,
   said control panel including an equipment selection region and an operation selection region, said equipment selection region displaying a list of registered ones of the connected digital signal processing equipment and an associated button area for each of the registered digital signal processing equipment whereby at least one of the registered digital signal processing equipment is selected from the list by selecting its associated button area,
   said registration panel including a connected equipment region and a registered equipment region, said registered equipment region displaying the list of the registered digital signal processing equipment, said connected equipment region displaying a list of the connected digital signal processing equipment and an associated mark area for each of the connected digital signal processing equipment, said mark area indicating whether the associated one of the connected digital signal processing equipment is registered or unregistered whereby changing the indication in a given mark area registers or unregisters its associated digital signal processing equipment and thereby adds the associated digital signal processing equipment to or removes the associated digital signal processing equipment from the list of the registered digital signal processing equipment that is displayed in said registered equipment region of said registration panel and that is displayed in said equipment selection region of said control panel, wherein when the number of the registered digital signal processing equipment is less than a maximum number of registered digital signal processing equipment, the associated digital signal processing equipment may be registered, and when the number of the registered digital signal processing equipment is the maximum number of registered digital signal processing equipment, the associated digital signal processing equipment may not be registered until at least one of the registered digital signal processing equipment is unregistered or disconnected from said digital broadcast receiving apparatus, the maximum number of registered digital signal processing equipment being less than a maximum number of connected digital signal processing equipment.

11. An apparatus according to claim 10, wherein when the mark area associated with a given one of the registered digital signal processing equipment indicates that the given digital signal processing equipment is reserved for a future operation, the indication in the mark area cannot be changed.

12. An apparatus according to claim 10, wherein the compressed video data and audio data are compressed according to an MPEG2 standard.

13. An apparatus according to claim 10, wherein said interface is an IEEE1394 interface.

14. An apparatus according to claim 10, wherein when the number of the connected digital signal processing equipment is less than a predefined value, a given one of the registered digital signal processing equipment may not be unregistered.

15. An apparatus according to claim 10, wherein when a given one of the registered digital signal processing equipment is disconnected from the apparatus, the display of the given digital signal processing equipment in said control panel is dimmed.

16. An apparatus according to claim 10, wherein when a given one of the connected digital signal processing equipment is disconnected from the apparatus, the display of the given digital signal processing equipment in said registration panel is dimmed.

17. An apparatus according to claim 10, wherein said operation selection region includes a plurality of function button areas.

18. An apparatus according to claim 10, wherein said control panel includes a button area for changing from said control panel to said registration panel, and said registration panel includes a further button area for changing from said registration panel to said control panel.

19. A method of delivering digital signals to at least one of a plurality of digital signal processing equipment connected to an apparatus, said method comprising:
   providing a picture plane operable to display a control panel or a registration panel,
   said control panel including an equipment selection region and an operation selection region, said equipment selection region displaying a list of registered ones of the connected digital signal processing equipment and an associated button area for each of the registered digital signal processing equipment,
   said registration panel including a connected equipment region and a registered equipment region, said registered equipment region displaying the list of the registered digital signal processing equipment, said connected equipment region displaying a list of the connected digital signal processing equipment and an associated mark area for each of the connected digital signal processing equipment, said mark area indicating whether the associated one of the connected digital signal processing equipment is registered or unregistered;
   changing the indication in at least one given mark area to register or unregister its associated digital signal processing equipment and thereby add the associated digital signal processing equipment to or remove the associated digital signal processing equipment from the list of the registered digital signal processing equipment that is displayed in said registered equipment region of said registration panel and that is displayed in said equipment selection region of said control panel, wherein when the number of the registered digital signal processing equipment is less than a maximum number of registered digital signal processing equipment, the associated digital signal processing equipment may be registered, and when the number of the registered digital signal processing equipment is the maximum number of registered digital signal processing equipment, the associated digital signal processing equipment may not be registered until at least one of the registered digital signal processing equipment is unregistered or disconnected from said digital broadcast receiving apparatus, the maximum number of registered digital signal processing equipment being less than a maximum number of connected digital signal processing equipment;

selecting at least one of the registered digital signal processing equipment by selecting its associated button area on said control panel;

receiving a digital broadcast signal;

decoding the received signal into decoded data selected from the group consisting of compressed video and audio data and pulse code modulated (PCM) audio data; and transmitting data to the at least one registered digital signal processing equipment, the transmitted data including the decoded data.

20. A method according to claim 19, wherein when the mark area associated with a given one of the registered digital signal processing equipment indicates that the given digital signal processing equipment is reserved for a future operation, said changing step cannot be carried out to change the indication in the mark area associated with the given digital signal processing equipment.

21. A method according to claim 19, wherein when the number of the connected digital signal processing equipment is less than a predefined value, said changing step cannot be carried out to unregister a given one of the registered digital signal processing equipment.

22. A method according to claim 19, wherein the compressed video data and audio data are compressed according to an MPEG2 standard.

23. A method according to claim 19, wherein said transmitting step is carried out via an IEEE1394 interface.

* * * * *

UNITED STATES PATENT AND TRADEMARK OFFICE
CERTIFICATE OF CORRECTION

| | |
|---|---|
| PATENT NO. | : 7,039,936 B1 |
| APPLICATION NO. | : 09/460083 |
| DATED | : May 2, 2006 |
| INVENTOR(S) | : Hajime Inoue et al. |

It is certified that error appears in the above-identified patent and that said Letters Patent is hereby corrected as shown below:

Column 9, line 61, after "apparatus", insert ";".

Signed and Sealed this

Twelfth Day of September, 2006

JON W. DUDAS
*Director of the United States Patent and Trademark Office*